United States Patent
Ahn

(10) Patent No.: US 9,401,499 B2
(45) Date of Patent: Jul. 26, 2016

(54) ELECTRODE ASSEMBLY AND SECONDARY BATTERY HAVING THE SAME

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 787 days.

(21) Appl. No.: 13/489,239

(22) Filed: Jun. 5, 2012

(65) Prior Publication Data

US 2012/0321924 A1     Dec. 20, 2012

(30) Foreign Application Priority Data

Jun. 17, 2011 (KR) .......................... 10-2011-0059136

(51) Int. Cl.
| | | |
|---|---|---|
| *H01M 4/00* | (2006.01) |
| *H01M 6/10* | (2006.01) |
| *H01M 2/02* | (2006.01) |
| *H01M 2/16* | (2006.01) |
| *H01M 2/26* | (2006.01) |
| *H01M 10/04* | (2006.01) |

(52) U.S. Cl.
CPC ............ *H01M 2/022* (2013.01); *H01M 2/1673* (2013.01); *H01M 2/263* (2013.01); *H01M 10/0431* (2013.01); *H01M 10/0481* (2013.01)

(58) Field of Classification Search
CPC ....................................................... H01M 4/00
USPC ........................................................... 429/94
See application file for complete search history.

(56) References Cited

U.S. PATENT DOCUMENTS

2009/0111011 A1*   4/2009   Kim et al. .................... 429/133
2010/0273036 A1   10/2010   Marple et al.

FOREIGN PATENT DOCUMENTS

| JP | 11-162516 A | 6/1999 |
|---|---|---|
| JP | 2008-243411 A | 10/2008 |
| KR | 2004-0058921 A | 7/2004 |
| KR | 10-2005-0052221 | 6/2005 |
| KR | 2009-0035704 A | 4/2009 |
| KR | 10-1034719 | 5/2011 |
| KR | 101034719 A * | 5/2011 |

OTHER PUBLICATIONS

Office Action dated Mar. 18, 2013 for corresponding KR Application No. 10-2011-0059136.

* cited by examiner

*Primary Examiner* — Daniel Gatewood
(74) *Attorney, Agent, or Firm* — Knobbe Martens Olson & Bear LLP

(57) ABSTRACT

A secondary battery includes a jelly roll including a positive and negative electrode plates respectively having positive and negative electrode non-coating portions and at least one separator; positive and negative electrode terminals each having a contact portion, an electrode terminal and an extending portion; elastic members respectively provided between the positive and negative electrode non-coating portions and the contact portions; an outer case that accommodates the jelly roll and the terminal portions in the state that the outer case is connected to the negative electrode terminal portion; a cap plate that seals the outer case; a support portion that supports and insulates the contact portion of each of the terminal portions respectively provided at both ends of the jelly roll; and a positive lead provided in the state that the positive electrode lead is insulated from the cap plate, and electrically connected to the positive electrode terminal portion.

9 Claims, 6 Drawing Sheets

ELECTRODE ASSEMBLY AND SECONDARY BATTERY HAVING THE SAME

RELATED APPLICATIONS

This application claims priority to and the benefit of Korean Patent Application No. 10-2011-0059136, filed on Jun. 17, 2011, in the Korean Intellectual Property Office, the entire content of which is incorporated herein by reference.

BACKGROUND

1. Field

An aspect of the present invention relates to an electrode assembly and a secondary battery having the same, and more particularly, to an electrode assembly and a secondary battery having the same, which do not require a separate manufacturing process for forming electrode tabs.

2. Description of the Related Art

A secondary battery is a chemical battery capable of performing repeated charge and discharge by means of reversible interconversion between chemical energy and electrical energy. Recently, as information communication devices have rapidly spread and large-capacity, high power batteries for automobiles have appeared, the secondary batteries comprising lithium secondary batteries having characteristics of high voltage and high-energy density, have been increasingly used.

Although a battery may be configured using all materials, a practical battery necessarily has a large capacity. The material used for the practical battery is necessarily a material having a large amount of charge and discharge electricity used in a potential section. The capacity may be divided into specific capacity and capacity density. Here, the specific capacity is a property of weight, and the capacity density is a property of volume. The battery configured using a material with high specific capacity and high capacity density is considered as a highly productive, value-added battery.

Typically, a lithium ion secondary battery is mainly composed of a positive electrode active material, a negative electrode active material, an electrolyte, a separator and the like. Currently, $LiCoO_2$ is frequently used as the positive electrode active material, and a carbon material such as graphite is used as the negative electrode active material. Here, the carbon material can absorb and remove lithium as an ion type.

SUMMARY

Embodiments provide a secondary battery which does not require separate electrode tabs respectively provided to non-coating portions of positive and negative electrode plates.

Embodiments also provided a secondary battery having stable structure.

According to an aspect of the present invention, there is provided an electrode assembly. The electrode assembly includes a jelly roll, a terminal portion and an elastic member.

The jelly roll includes a positive electrode plate having a positive electrode non-coating portion on which a positive electrode active material is not coated, at least one separator and a negative electrode plate having a negative electrode non-coating portion on which a negative electrode active material is not coated. In the jelly roll, the positive and negative electrode plates are positioned so that the positive and negative electrode non-coating portions are opposite to each other, and the separator is interposed between the positive and negative electrode plates so as to be wound in the state that the positive and negative electrode plates are insulated from each other. The terminal portion has a contact portion that comes in contact with the positive or negative electrode non-coating portion, an electrode terminal extended from the contact portion, and an extending portion extended in a direction opposite to the extending direction of the electrode terminal from an outer edge of the contact portion so as to form a space in the inside thereof. The terminal portion includes a pair of positive and negative electrode terminal portions. The elastic member includes a pair of elastic members to be respectively provided between the positive electrode non-coating portion and the contact portion of the positive electrode terminal portion and between the negative electrode non-coating portion and the contact portion of the negative electrode terminal portion.

According to an aspect of the present invention, there is provided a secondary battery. The secondary battery includes a jelly roll, positive and negative electrode terminal portion, elastic members, an outer case, a cap plate, insulating members and a positive electrode lead.

The jelly roll includes a positive electrode plate having a positive electrode non-coating portion on which a positive electrode active material is not coated, at least one separator and a negative electrode plate having a negative electrode non-coating portion on which a negative electrode active material is not coated. In the jelly roll, the positive and negative electrode plates are positioned so that the positive and negative electrode non-coating portions are opposite to each other, and the separator is interposed between the positive and negative electrode plates so as to be wound in the state that the positive and negative electrode plates are insulated from each other. Each of the positive and negative terminal portions has a contact portion that comes in contact with the positive or negative electrode non-coating portion, an electrode terminal extended from the contact portion, and an extending portion extended in a direction opposite to the extending direction of the electrode terminal from an outer edge of the contact portion so as to form a space in the inside thereof. The elastic members are provided between the positive electrode non-coating portion and the contact portion of the positive electrode terminal portion and between the negative electrode non-coating portion and the contact portion of the negative electrode terminal portion, respectively. The outer case accommodates the jelly roll and the terminal portions in the state that the outer case is connected to the negative electrode terminal portion. The cap plate seals the outer case. The support portion supports and insulates the contact portion of each of the terminal portions respectively provided at both ends of the jelly roll. The positive electrode lead is provided in the state that the positive electrode lead is insulated from the cap plate, and electrically connected to the positive electrode terminal portion.

The secondary battery may further include insulating members respectively provided between adjacent positive electrode non-coating portions and between adjacent negative electrode non-coating portions so as to support the positive and negative electrode terminal portions. A non-conductive adhesive may be coated on a surface of the insulating member.

The insulating member may be provided so that the non-coating portion is exposed by 1 mm or less.

The insulating member provided between the adjacent positive electrode non-coating portions may be formed to have a thickness identical to the distance between the adjacent positive electrode non-coating portions or slightly greater than the distance between the positive electrode non-coating portions. The insulating member provided between the adjacent negative electrode non-coating portions may be formed to have a thickness identical to the distance between the adjacent negative electrode non-coating portions or slightly greater than the distance between the negative electrode non-coating portions.

The positive and negative electrode non-coating portions may be formed to have a width of 1 mm or less.

The extending portion may come in contact with the positive or negative electrode non-coating portion when assembling the secondary battery.

The outer case may be formed of a conductive material.

According to embodiments of the present invention, it is possible to provide a secondary battery having a terminal portion that comes in contact with a non-coating portion without using a separate electrode tab that requires a welding operation or the like.

Further, it is possible to provide a secondary battery having a more stable structure by providing an insulating member that compensates for the thickness of a non-coating portion.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
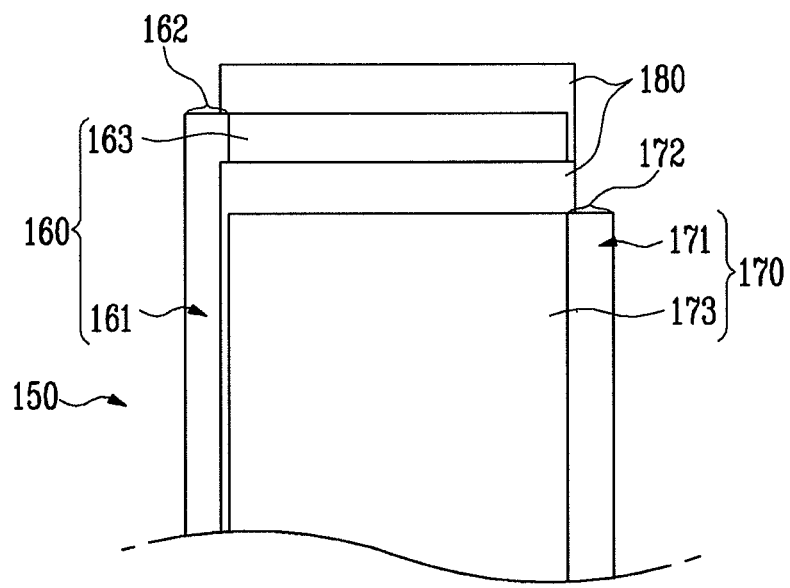
FIG. 1 is a partial cut-away view showing a jelly roll in an unfolded state according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

A small-, medium- and large-sized secondary battery is manufactured using an electrode assembly including a jelly roll. In the case of a general secondary battery, the secondary battery may be composed of an external case, a cap plate, an insulative support portion, and the like. The outer case serves as a housing and an electrode terminal, and the cap plate has an electrode lead that serves as the other electrode terminal. In the case of a small-sized secondary battery, a single jelly roll or electrode assembly is provided to the inside of the outer case. In the case of the medium- or large-sized secondary battery, a plurality jelly rolls or electrode assemblies are provided to the inside of the outer case. The electrodes are connected to the outer case and the electrode lead of the cap plate, respectively. In this instance, the insulative support portion allows the electrodes to be electrically connected to the outer case and the electrode lead of the cap plate, and supports the jelly roll. The present invention relates to an electrode assembly built in the inside of an outer case.

An electrode assembly in a secondary battery according to an embodiment of the present invention may be divided into a jelly roll and a terminal portion. Hereinafter, these components will be described in detail.

A jelly roll 150 will be described with reference to FIGS. 1 and 2.

Figure 2:
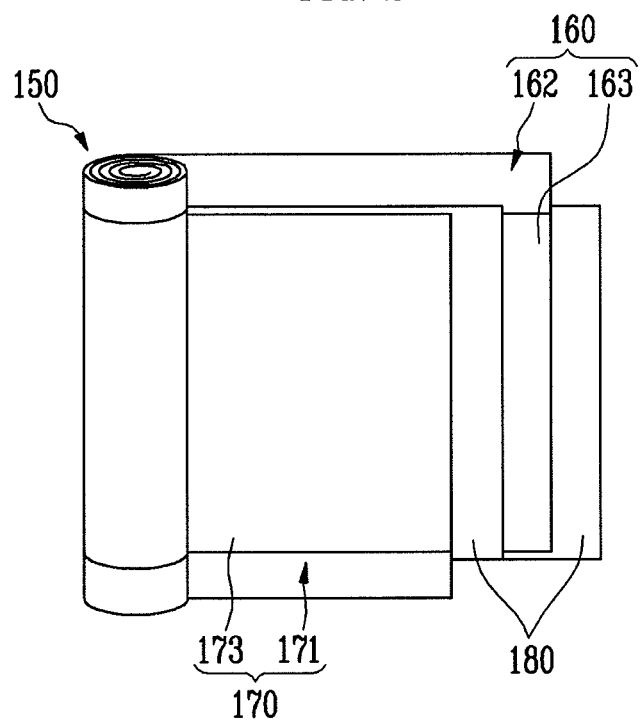
FIG. 2 is a perspective view showing a state that the jelly roll of FIG. 1 is partially wound.

FIG. 1 is a partial cut-away view showing a jelly roll in an unfolded state according to an embodiment of the present invention. FIG. 2 is a perspective view showing a state that the jelly roll of FIG. 1 is partially wound.

As shown in FIG. 1, the jelly roll 150 includes a positive electrode plate 160, a separator 180 and a negative electrode plate 170.

The positive electrode plate 160 has a positive electrode active material layer 163 formed by coating a positive electrode active material on one or both surfaces of a positive electrode collector 161. In this instance, the portion of the positive electrode collector 161, on which the positive electrode active material is not coated, is referred to as a positive electrode non-coating portion 162. A material having high conductivity and high chemical stability is frequently used as the positive electrode collector 161. For example, the positive electrode collector 161 may include aluminum, nickel, titanium, plastic carbon, and the like.

The negative electrode plate 170 has a negative electrode active material layer 173 formed by coating a negative electrode active material on a negative electrode collector 171. Similarly, the portion of the negative electrode collector 171, on which the negative electrode active material is not coated, is referred to as a negative electrode non-coating portion 172. The negative electrode plate 170 may be formed of, for example, copper, stainless steel, aluminum, nickel or the like.

The separator 180 is interposed between the positive and negative electrode plates 160 and 170. The separator 180 becomes a path of ions and functions to insulate the positive and negative electrode plates 160 and 170 from each other by preventing the positive and negative electrode plates 160 and 170 from coming in direct contact with each other. Thus, the separator 180 is formed of an insulative thin film having high ion transmittance and mechanical strength. For example, a porous film or unwoven fabric including polyethylene, polypropylene or polyvinylidene fluoride may be used as the separator 180.

Electrode assemblies used in secondary batteries may be classified into a wound-type electrode assembly, a stacked-type electrode assembly, and the like. The wound-type electrode assembly is formed by winding sheet-shaped positive and negative electrode plates that are positioned over each other but are insulated from each other by a separator.

The jelly roll 150 is formed by sequentially stacking the separator 180, the positive electrode plate 160, the separator 180 and the negative electrode plate 170 and then winding the stack. In this instance, the jelly roll 150 may be formed by sequentially stacking the positive electrode plate 160, the separator 180, the negative electrode plate 170 and the separator 180. This is because such a stacked structure is repeated in the winding of the jelly roll 150 as shown in FIG. 2.

Further, as described above, the positive electrode plate 160 is divided into the positive electrode active material layer 163 and the positive electrode non-coating portion 162, and the negative electrode plate 170 is divided into the negative electrode active material layer 173 and the negative electrode non-coating portion 172. In a case where the positive electrode plate 160 is stacked on the separator 180, the positive electrode non-coating portion 162 is exposed to one side portion of the separator 180. Similarly, in a case where the negative electrode plate 170 is stacked on the separator 180, the negative electrode non-coating portion 172 is exposed to the other side portion of the separator 180. If the jelly roll 150 in an unfolded state is wound, the positive and negative electrode non-coating portions 162 and 172 are respectively exposed to one and the other ends of the jelly roll 150 as shown in FIG. 2.

Figure 3A:
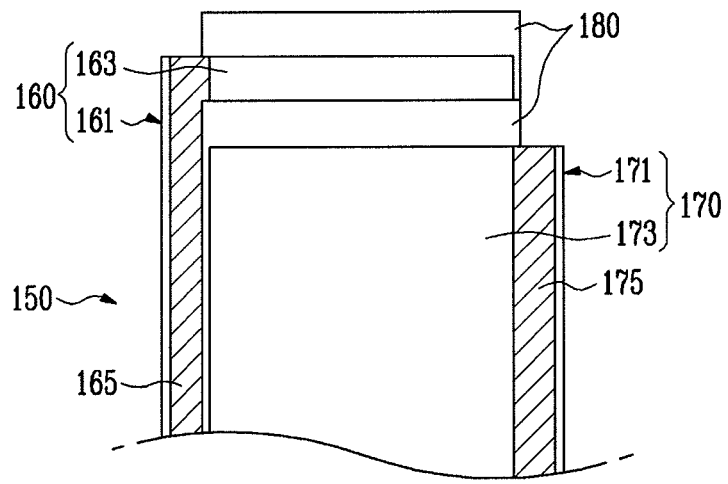
FIG. 3A is a partial cut-away view showing the jelly roll having an insulating member interposed between non-coating portions.
Figure 3B:
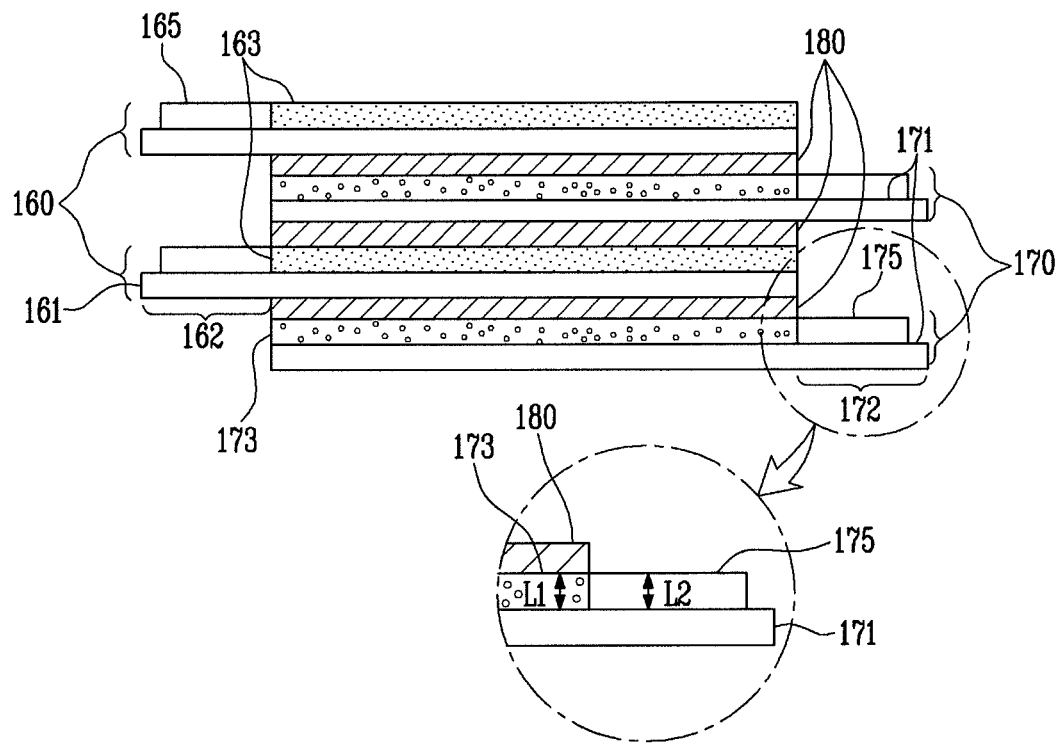
FIG. 3B is a sectional view showing an interlayer structure of the wound jelly roll according to an embodiment of the present invention.
Figure 3C:
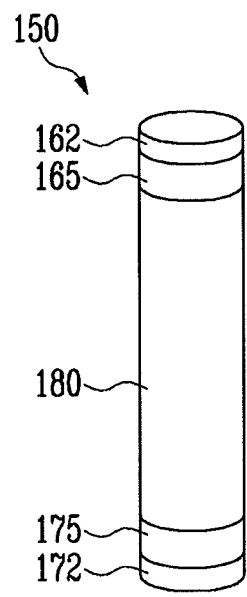
FIG. 3C is a perspective view showing a state that the jelly roll is wound.

Insulating members 165 and 175 will be described with reference to FIGS. 3A to 3C. FIG. 3A is a partial cut-away view showing the jelly roll having an insulating member interposed between non-coating portions. FIG. 3B is a sectional view showing an interlayer structure of the wound jelly roll according to an embodiment of the present invention. FIG. 3C is a perspective view showing a state that the jelly roll is wound.

As shown in FIG. 3B, a certain space is formed between the positive electrode non-coating portions 162 at one end of the jelly roll 150, and a certain space is formed between the negative electrode non-coating portions 172 at the other end of the jelly roll 150. Therefore, both the ends of the jelly roll 150 may be distorted by an external force, or the like. Hence, the mechanical strength at both the ends of the jelly roll 150 is weak. The insulating members 165 and 175 serve as reinforcing members for reinforcing the mechanical strength at both the ends of the jelly roll 150.

As shown in FIG. 3A, the insulating members 165 and 175 are attached to the positive and negative electrode non-coating portions 162 and 172, respectively. If the jelly roll 150 is wound in such a state, the insulating members 165 and 175 are provided between the positive electrode non-coating portions 162 of adjacent positive electrode plates 160 and between the negative electrode non-coating portions 172 of adjacent negative electrode plates 170, respectively. In this instance, a non-conductive adhesive such as an insulating tape may be coated on surfaces of the insulating members 165 and 175 so as to improve the adhesion between the insulating members 165 and 175.

Meanwhile, the insulating members 165 and 175 may be provided to cover the entire areas of the positive and negative electrode non-coating portions 162 and 172, respectively. In this case, side portions of the positive and negative electrode collectors 161 and 171 are not covered by the respective insulating members 165 and 175 but exposed. Thus, the positive and negative electrode collectors 161 and 171 can serve as electrodes. However, the insulating members 165 and 175 are preferably provided so that each of the positive and negative electrode non-coating portions 162 and 172 is exposed to have a width of about 1 mm or less in consideration of sufficient electrical conductivity.

Figure 7:
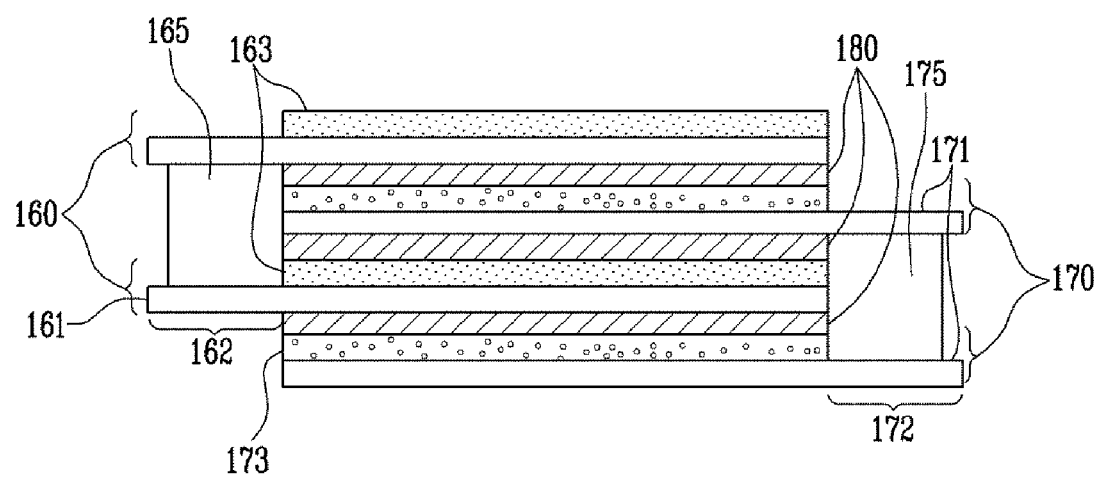
FIG. 7 is a sectional view showing an interlayer structure of the wound jelly roll according to another embodiment of the present invention.

Referring to FIG. 7, two separators 180, a positive electrode active material layer 163 and a negative electrode plate 170 are interposed between adjacent positive electrode plates 160. The insulating member 165 provided between the positive electrode non-coating portions 162 and the maximum thickness of insulating member 165 may correspond to the distance between the adjacent positive electrode non-coating portions 162. This is the same in the case of the insulating member 175 provided between the negative electrode non-coating portions 172.

Meanwhile, the insulating member 165 or 175 may be provided to have a thickness slightly greater than the distance between the non-coating portions 162 or 172. This is provided for the purpose of thickness compensation for coating the non-conductive adhesive or the like. In a case where the jelly roll 150 having the insulating members 165 and 175 is wound as described above, the positive and negative electrode non-coating portions 162 and 172 each having the minimum width are respectively exposed to both ends of the jelly roll 150 as shown in FIG. 3C. In this case, the insulating member 165 or 175 is filled in the space between the non-coating portions 162 or 172, so that it is possible to reinforce the mechanical strength of both the ends of the jelly roll 150.

As shown in FIG. 3B, the thickness L2 of each of the insulating members 165 and 175 may be formed identical to that L1 of each of the positive and negative electrode active material layers 163 and 173.

Figure 4:
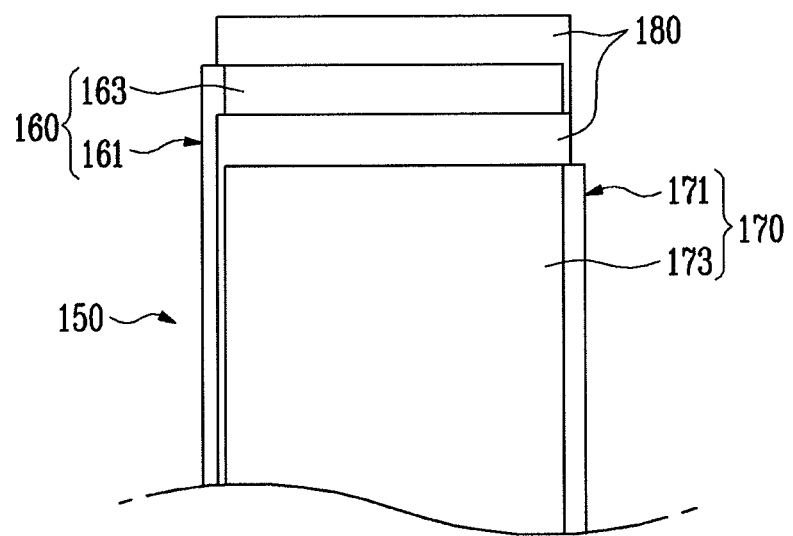
FIG. 4 is a partial cut-away view showing the jelly roll in which non-coating portions having a narrow width are formed.

A configuration for reinforcing the mechanical strength at both ends of the jelly roll 150 without an insulating member will be described with reference to FIG. 4. FIG. 4 is a partial cut-away view showing the jelly roll in which non-coating portions having a narrow width are formed.

In a case where each of the electrode plates 160 and 170 are formed to manufacture the jelly roll 150, each of the positive and negative electrode non-coating portions 162 and 172 may be formed to have a width ranging from 1 to 2 mm. In a case where the jelly roll 150 is pressed while terminal portions which will be described later come in contact with both the respective ends of the jelly roll 150, a short circuit may occur due to a contact of the electrode plate with the other electrode plate. Therefore, the width of the separator 180 may be formed wider than that of each of the positive and negative electrode active material layers 163 and 173. In this instance, the separator 180 may be formed to be further extended by about 1 mm toward the positive electrode non-coating portion 162 from the side of the positive electrode active material layer 163, or may be formed to cover a side end of the positive electrode non-coating portion. The separator 180 may be extended identically in the direction of the negative electrode non-coating portion 172.

Figure 5A:
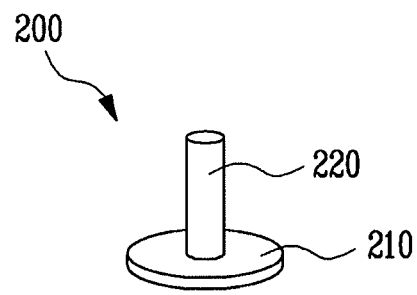
FIG. 5A is a perspective view showing a terminal portion according to an embodiment of the present invention.
Figure 5B:
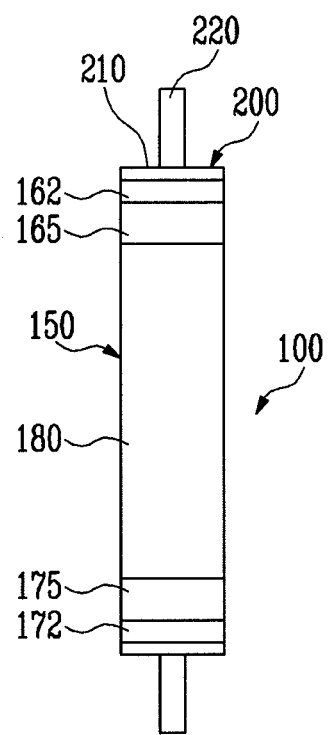
FIG. 5B is a front view showing the terminal portion of FIG. 5A and the jelly roll.

A terminal portion 200 will be described with reference to FIGS. 5A and 5B. FIG. 5A is a perspective view showing a terminal portion according to an embodiment of the present invention. FIG. 5B is a front view showing the terminal portion of FIG. 5A and the jelly roll.

The terminal portion 200 is configured to substitute for a conventional terminal tab welded to a positive or negative electrode non-coating portion so as to serve as a terminal. The terminal portion 200 according to this embodiment is divided into a contact portion 210 and an electrode terminal 220. The contact portion 210 is formed in the shape of a plate so as to come in contact with each of both the ends of the jelly roll 150. As shown in FIG. 5A, the electrode terminal 220 is extended to have a certain length from a top of the contact portion 210. As shown in FIG. 5B, a pair of terminal portions 200 are provided to come in contact with both the ends of the jelly roll 150, respectively. Then, in a case where the electrode assembly according to this embodiment is accommodated in the outer case of the secondary battery, the contact portions 210 of the terminal portions 200 are pressed toward the jelly roll 150 by a support body, thereby fixing the jelly roll 150.

Figure 6:
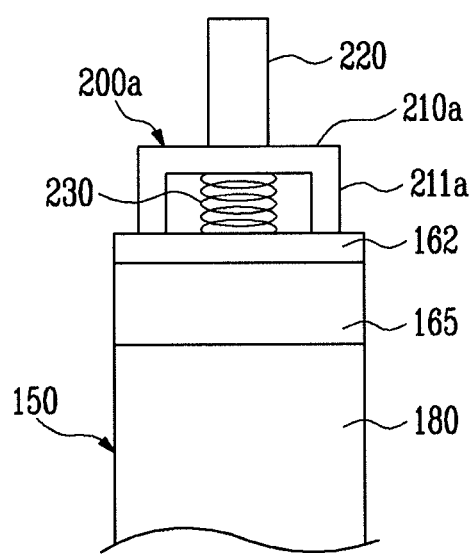
FIG. 6 is a partial sectional view showing a terminal portion according to an embodiment of the present invention.

A terminal portion 200a according to another embodiment of the present invention will be described with reference to FIG. 6. FIG. 6 is a partial sectional view showing a terminal portion according to an embodiment of the present invention.

The terminal portion 200a according to this embodiment is provided with an elastic member 230. That is, the elastic member 230 is interposed between a contact portion 210a and the positive electrode non-coating portion 162, so that it is possible to fix the jelly roll 150 with a stronger strength even when the contact portion 210a is pressed with the same force.

Meanwhile, the terminal portion 200a may be provided with an extending portion 211a extended toward jelly roll 150 from an outer edge of the contact portion 210a. The extending portion 211a allows a certain space to be formed in the inside thereof, so that it is possible to serve as a guide when the elastic member 230 is extended or contracted and to prevent the elastic member 230 from being detached to the outside of the terminal portion 200a when fixing the jelly roll 150. In place of the contact portion 210, an end of the extending portion 211a functions to electrically connect the jelly roll 150 and the terminal portion 200a to each other by coming in contact with the jelly roll 150.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
    a jelly roll comprising a positive electrode plate having a positive electrode non-coating portion on which a positive electrode active material is not coated, at least one separator and a negative electrode plate having a negative electrode non-coating portion on which a negative electrode active material is not coated, wherein the positive and negative electrode plates are positioned so that the positive and negative electrode non-coating portions are opposite to each other, and the separator is interposed between the positive and negative electrode plates so as to be wound in a state that the positive and negative electrode plates are insulated from each other;
    positive and negative terminal portions each having:
        a planar contact portion having at least a first face and a second face wherein the first and second faces of the contact portion face in opposite directions,
        an electrode terminal extended from the first face of the contact portion upward in a first direction away from the jelly roll, and
        an extending portion that comes in contact with the positive or negative electrode non-coating portion, extended downward in a second direction opposite to the first direction towards the jelly roll from an outer edge of the second face of the contact portion, so as to form a space in the inside thereof; and
    elastic members respectively provided between the positive electrode non-coating portion and the contact portion of the positive electrode terminal portion and between the negative electrode non-coating portion and the contact portion of the negative electrode terminal portion and
    insulating members respectively provided between adjacent positive electrode non-coating portions and between adjacent negative electrode non-coating portions so as to support the positive and negative electrode terminal portions.

2. The secondary battery according to claim 1, wherein the elastic members press the jelly roll in a direction of a center axis of the jelly roll.

3. The secondary battery according to claim 1, wherein the insulating member is formed to have a thickness identical to that of the positive or negative electrode active material layers.

4. The secondary battery according to claim 1, wherein the thickness of the insulating member is formed to have a thickness identical to a distance between the adjacent non-coating portions.

5. The secondary battery according to claim 1, wherein a non-conductive adhesive is coated on a surface of the insulating member.

6. The secondary battery according to claim 1, wherein the insulating member is provided so that the non-coating portion is exposed by 1 mm or less.

7. The secondary battery according to claim 1, wherein the insulating member provided between the adjacent positive electrode non-coating portions is formed to have a thickness identical to the distance between the adjacent positive electrode non-coating portions or slightly greater than the distance between the positive electrode non-coating portions, and the insulating member provided between the adjacent negative electrode non-coating portions is formed to have a thickness identical to the distance between the adjacent negative electrode non-coating portions or slightly greater than the distance between the negative electrode non-coating portions.

8. The secondary battery according to claim 1, wherein the positive and negative electrode non-coating portions are formed to have a width of 1 mm or less.

9. The secondary battery according to claim 1, wherein the extending portion comes in contact with the positive or negative electrode non-coating portion when assembling the secondary battery.

* * * * *